(12) United States Patent
Bilgic et al.

(10) Patent No.: US 12,487,307 B2
(45) Date of Patent: Dec. 2, 2025

(54) DISTORTION-FREE DIFFUSION AND QUANTITATIVE MAGNETIC RESONANCE IMAGING WITH BLIP UP-DOWN ACQUISITION OF SPIN- AND GRADIENT-ECHOES

(71) Applicant: The General Hospital Corporation, Boston, MA (US)

(72) Inventors: Berkin Bilgic, Winchester, MA (US); Zijing Zhang, Malden, MA (US); Congyu Liao, Charlestown, MA (US); JaeJin Cho, Cambridge, MA (US); Mary Kate Manhard, Cambridge, MA (US)

(73) Assignee: The General Hospital Corporation, Boston, MA (US)

( * ) Notice: Subject to any disclaimer, the term of this patent is extended or adjusted under 35 U.S.C. 154(b) by 166 days.

(21) Appl. No.: 18/552,973

(22) PCT Filed: Mar. 28, 2022

(86) PCT No.: PCT/US2022/022124
§ 371 (c)(1),
(2) Date: Sep. 28, 2023

(87) PCT Pub. No.: WO2022/212244
PCT Pub. Date: Oct. 6, 2022

(65) Prior Publication Data
US 2024/0183924 A1 Jun. 6, 2024

Related U.S. Application Data

(60) Provisional application No. 63/167,080, filed on Mar. 28, 2021.

(51) Int. Cl.
*G01R 33/563* (2006.01)
*G01R 33/50* (2006.01)
(Continued)

(52) U.S. Cl.
CPC ....... *G01R 33/56341* (2013.01); *G01R 33/50* (2013.01); *G01R 33/5608* (2013.01); *G01R 33/5616* (2013.01)

(58) Field of Classification Search
None
See application file for complete search history.

(56) References Cited

U.S. PATENT DOCUMENTS 5,621,321 A * 4/1997 Liu ................... G01R 33/56554
324/309
6,400,151 B1 * 6/2002 Haase ................ G01R 33/5615
324/309
(Continued)

OTHER PUBLICATIONS

Andersson, J. et al., How to Correct Susceptibility Distortions in Spin-Echo Echo-Planar Images: Application to Diffusion Tensor Imaging, NeuroImage, 2003, 20(2):870-888.
(Continued)

*Primary Examiner* — Rodney E Fuller
(74) *Attorney, Agent, or Firm* — QUARLES & BRADY LLP (57) ABSTRACT

Magnetic resonance imaging ("MRI") using a spin- and gradient-echo ("SAGE") pulse sequence with blip up-down acquisition ("BUDA") encoding enables distortion-free, high-resolution diffusion-weighted imaging and/or quantitative parameter mapping. Phase-encoding polarities are alternated across shots during a multi-shot acquisition. In each shot, multi-contrast data are acquired at echo times associated with a gradient echo, a mixed gradient-and-spin echo, and a spin echo. High in-plane resolution and distortion-free quantitative parameter maps can be generated, such as T2 maps, T2* maps, paramagnetic susceptibility maps, and diamagnetic susceptibility maps. Diffusion-weighted data can be acquired using diffusion encoding gradients and BUDA encoding, where multi-contrast data are acquired in
(Continued)

the b=0 acquisition. Diffusion parameter maps can be generated from the b=0 and diffusion-weighted data.

20 Claims, 5 Drawing Sheets

(51) Int. Cl.
  *G01R 33/56* (2006.01)
  *G01R 33/561* (2006.01)

(56) References Cited

U.S. PATENT DOCUMENTS

| | | | |
|---|---|---|---|
| 11,022,665 B2 | 6/2021 | Setsompop et al. | |
| 2015/0362575 A1 | 12/2015 | Ourselin et al. | |
| 2017/0276755 A1* | 9/2017 | Hoge | G01R 33/5611 |
| 2019/0369185 A1 | 12/2019 | Setsompop et al. | |
| 2019/0369190 A1 | 12/2019 | Ye et al. | |
| 2020/0110144 A1 | 4/2020 | Frydman et al. | |
| 2022/0383561 A1* | 12/2022 | Jiang | G01R 33/4818 |
| 2024/0385274 A1* | 11/2024 | Jain | G01R 33/5608 |

OTHER PUBLICATIONS

Bilgic, B. et al., Highly Accelerated Multishot Echo Planar Imaging Through Synergistic Machine Learning and Joint Reconstruction, Magnetic Resonance in Medicine, 2019, 82(4):1343-1358.

Dabov, K. et al., Image Denoising by Sparse 3-D Transform-Domain Collaborative Filtering, IEEE Transactions on Image Processing, 2007, 16(8):2080-2095.

Liao, C. et al., Highly Efficient MRI through Multi-Shot Echo Planar Imaging, In Wavelets and Sparsity XVIII, SPIE, 2019, 11138:353-365.

Ma, D. et al., Magnetic Resonance Fingerprinting, Nature, 2013, 495(7440):187-192.

Mani, M. et al., Multi-Shot Sensitivity-Encoded Diffusion Data Recovery Using Structured Low-Rank Matrix Completion (MUSSELS), Magnetic Resonance in Medicine, 2017, 78(2):494-507.

Quan, Y. et al., Self2Self with Dropout: Learning Self-Supervised Denoising from Single Image, In Proceedings of the IEEE/CVF Conference on Computer Vision and Pattern Recognition, 2020, pp. 1890-1898.

Schmiedeskamp, H. et al., Combined Spin- and Gradient-Echo Perfusion-Weighted Imaging, Magnetic Resonance in Medicine, 2012, 68(1):30-40.

Setsompop, K. et al., Blipped-Controlled Aliasing in Parallel Imaging for Simultaneous Multislice Echo Planar Imaging with Reduced g-Factor Penalty, Magnetic Resonance in Medicine, 2012, 67(5):1210-1224.

Uecker, M. et al., ESPIRiT—An Eigenvalue Approach to Autocalibrating Parallel MRI: Where SENSE Meets GRAPPA, Magnetic Resonance in Medicine, 2014, 71(3):990-1001.

Zhang, Z. et al., dSAGE Enables Distortion-Free Diffusion, Spin and Gradient Echo Imaging in 1 Minute, Proc. Intl. Soc. Mag. Reson. Med., 2020, 28, Abstract #0603, 3 pages.

PCT International Search Report and Written Opinion, PCT/US2022/022124, Jul. 14, 2022, 8 pages.

* cited by examiner

DISTORTION-FREE DIFFUSION AND QUANTITATIVE MAGNETIC RESONANCE IMAGING WITH BLIP UP-DOWN ACQUISITION OF SPIN- AND GRADIENT-ECHOES

STATEMENT OF FEDERALLY SPONSORED RESEARCH

This invention was made with government support under EB028797 awarded by the National Institutes of Health. The government has certain rights in the invention.

BACKGROUND

There remains a need for MRI systems and methods for rapid scanning and increased robustness against patient motion. Such devices and techniques would be impactful in imaging vulnerable populations (e.g., acutely sick in-patients or kids) as well as in providing a CT-like table time for high throughout imaging.

SUMMARY OF THE DISCLOSURE

The present disclosure addresses the aforementioned drawbacks by providing a method for magnetic resonance imaging ("MRI") in which multi-contrast data are acquired with a an MRI system using a multi-shot echo planar imaging ("msEPI") pulse sequence. The msEPI pulse sequence includes changing a phase-encoding polarity across the multiple shots of the msEPI pulse sequence. In each shot of the msEPI pulse sequence, data are acquired at a first echo time associated with a gradient echo, a second echo time associated with a mixed gradient-and-spin echo, and a third echo time associated with a spin echo. Field inhomogeneity data are computed from the multi-contrast data. One or more images are reconstructed from the multi-contrast data using the field inhomogeneity data in order to reduce geometric distortions in the reconstructed image.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the invention, however, and reference is therefore made to the claims and herein for interpreting the scope of the invention.

DETAILED DESCRIPTION

Described here are systems and methods for magnetic resonance imaging ("MRI") using a spin- and gradient-echo ("SAGE") pulse sequence to enable distortion-free, high-resolution diffusion-weighted imaging and/or quantitative mapping. A blip up-down acquisition ("BUDA") encoding, which alternates phase-encoding polarities across shots during a multi-shot acquisition, can be used to eliminate or otherwise reduce geometric distortions. By combining a SAGE pulse sequence with BUDA encoding ("BUDA-SAGE"), distortion-free, high-resolution multi-contrast structural and/or diffusion-weighted magnetic resonance images can be obtained in a short period of time. Additionally or alternatively, the BUDA-SAGE techniques described in the present disclosure can be flexibly utilized to obtain high in-plane resolution and distortion-free quantitative parameter maps, such as T2 maps, T2* maps, paramagnetic susceptibility maps, diamagnetic susceptibility maps, and the like.

Distortion-free structural MRI, diffusion MRI, and/or quantitative mapping can provide a powerful tool for clinical diagnosis and brain research. The data acquisition and image reconstruction techniques described in the present disclosure provide high in-plane resolution images and eliminate geometric distortion, thereby making images obtained using diffusion MRI and/or quantitative mapping techniques easier to interpret and register to undistorted anatomical reference data.

In some embodiments, as noted above, the SAGE pulse sequence is implemented for diffusion-weighted magnetic resonance imaging. In these instances, the pulse sequence may be referred to as a diffusion SAGE ("dSAGE") pulse sequence. The dSAGE pulse sequence is capable of acquiring distortion-free, high-resolution diffusion, spin- and gradient-echo images within a very short time. Additionally, the dSAGE pulse sequence can provide T2 and T2* parameter maps using additional contrasts that can also be rapidly obtained. Advantageously, these parameter maps can be employed to improve the sensitivity and specificity of diffusion imaging to various disease conditions. Alternatively, quantitative parameter mapping can be realized using a SAGE pulse sequence without diffusion-weighting, as will be described below. Vulnerable patient populations such as pediatric and elderly subjects, and/or other patient population who may have difficulty remaining still during data acquisition, can be more readily imaged using the SAGE techniques described in the present disclosure. For instance, SAGE can reduce the scan period to one minute, thereby providing increased motion robustness, while providing clinically desired multi-contrast data.

In general, diffusion-weighted MRI techniques acquire multiple diffusion-weighted images, in which additional diffusion-encoding (or diffusion-weighting) magnetic field gradients are applied prior to the image readout (or data acquisition). The diffusion-encoding gradients provide sensitivity to diffusion of water molecules along different spatial directions. The amount of this diffusion weighting is related to the amplitude and duration of the additional gradients, which may be characterized with the "b-value" metric. In addition to acquiring diffusion-weighted images, a diffusion MRI pulse sequence will routinely acquire data without diffusion weighting, which may be referred to as a "b=0" image, or non-diffusion-weighted image. This b=0 image can be used as a normalization factor when computing apparent diffusion coefficient ("ADC") maps, or other diffusion parameter maps. Because there is no diffusion weighting in the b=0 image, there are no diffusion-encoding gradients played out prior to its acquisition.

Due to the need for collecting multiple DWIs, as well as b-0 images, within a clinically feasible timeframe, diffusion MRI sequences often utilizes an echo planar imaging ("EPI") readout strategy. EPI encodes information from an entire imaging slice within a short period of time (e.g., around 100 ms), and thus can rapidly provide whole-brain coverage. However, EPI acquisitions are typically not capable of achieving high in-plane resolution because of severe geometric distortions and voxel pile-ups that can stem from main magnetic field inhomogeneities.

Data acquired using an EPI acquisition can also suffer from significant resolution loss due to T2*- and/or T2-relaxation during readout, which may often be lengthy. These artifacts can constrain the achievable in-plane resolution of EPI-based diffusion MRI to 1.5-2 mm. Parallel imaging techniques allows for up to R=4 acceleration to reduce the readout duration, which can partially mitigate these artifacts. Multi-shot EPI ("msEPI") encodes information from each slice across multiple acquisitions, which can then be combined to provide a final image. This allows for acceleration rates of R≥8, but requires several shots of data for adequate image quality. In addition to reducing the acquisition efficiency, msEPI also fails to eliminate geometric distortions.

It is an aspect of the present disclosure to exploit unused sequence time during the b-0 acquisition (due to the lack of diffusion-encoding gradients) in a dSAGE pulse sequence to collect additional multi-contrast magnetic resonance image data. Additionally or alternatively, such multi-contrast magnetic resonance image data can be acquired without diffusion MRI using a SAGE pulse sequence without any diffusion-weighting (i.e., similar to the b-0 acquisition in a diffusion MRI sequence). For instance, additional T2-weighted and/or T2*-weighted data can be acquired. To provide these additional image contrasts at high in-plane resolution with high quality, an msEPI acquisition can be used. As mentioned above, a BUDA encoding scheme can be implemented with the dSAGE and/or SAGE pulse sequence in order to acquire field inhomogeneity information that can be incorporated into the image reconstruction, thereby eliminating geometric distortion. By using BUDA with a dSAGE pulse sequence ("BUDA-dSAGE"), whole-brain, fast, distortion-free, high-SNR images can be acquired with T2*-, T2'-, and T2-weighted contrasts, and diffusion parameter maps, such as ADC maps, can be generated from the diffusion-weighted images. Alternatively, by using BUDA encoding with a SAGE pulse sequence ("BUDA-SAGE"), whole-brain, fast, distortion-free, high-SNR multi-contrast images can be acquired (e.g., T2-weighting, T2*-weighting, etc.), from which quantitative parameter maps can be generated.

In general, dSAGE adds additional EPI readouts (e.g., two additional EPI readouts) to exploit the dead time created by the absence of diffusion gradients during the b-0 acquisition. In this way, the conventional b=0 acquisition is replaced with a SAGE pulse sequence. As a non-limiting example, combining dSAGE with a 4-shot BUDA encoding at high acceleration factor can enable distortion-free, 1-minute clinical scans at high in-plane resolution (e.g., 1×1×4 mm$^3$) with gradient-, spin-, and mixed-echo images as well as three-direction diffusion MRI. At R=6 to 8-fold acceleration, the T2- and T2*-related resolution loss can also be minimized. Advantageously, acquiring these multiple echoes allows for quantitative T2 and T2* parameter mapping, thereby improving the utility of this pulse sequence and extending it to quantitative MRI.

In addition or alternatively to diffusion imaging, the BUDA-SAGE pulse sequences described in the present disclosure can be used to acquire multi-contrast data for quantitative parametric mapping, such as T2 mapping, T2' mapping, T2* mapping, and quantitative susceptibility mapping ("QSM"). As noted above, this quantitative parametric mapping takes advantage of the synergistic combination of an efficient multi-shot SAGE acquisition with BUDA encoding. In some implementations, Slider encoding can additionally be used to provide for super-resolution imaging, and machine learning-based denoising can be implemented to provide an additional improvement in signal-to-noise ratio ("SNR"). In general, these techniques implement a multi-contrast EPI acquisition, in which two additional readouts are inserted before and after the 180-degree refocusing pulse in a spin-echo EPI sequence to collect additional T2*- and T2'-weighted contrasts in one scan. By changing the TEs, additional contrasts can be rapidly obtained. Distortion-free EPI is enabled by alternating the phase-encoding polarities across the shots during a multi-shot acquisition (e.g., by using a BUDA encoding). This allows for eliminating geometric distortions during reconstruction.

In some implementation, SNR can be improved by using a self-supervised denoising, such as an MR-S2S denoising. The MR-S2S network can be trained without an external reference dataset, while performing similarly as its supervised counterpart. Such self-supervised training paradigms help increase robustness against potential generalization issues that supervised networks may suffer from. Slider encoding can also be used to provide super-resolution images, as noted above. By performing multiple thick-slice acquisitions and using a super-resolution reconstruction, image SNR can be further boosted to permit high isotropic resolution imaging using EPI readouts.

The ability of QSM, in particular, to disentangle paramagnetic and diamagnetic contributions to tissue susceptibility provides advantages for imaging neurodegenerative diseases. For instance, QSM enables disentangling iron from myelin or other diamagnetic proteins (e.g., amyloid and tau), which can contribute to an understanding of disease mechanisms in neurodegenerative diseases, such as multiple sclerosis and Alzheimer's disease. Source separation QSM is an emerging approach that could help accomplish this goal, along with other influential modeling approaches. With the BUDA-SAGE acquisitions described in the present disclosure, distortion-free, high-resolution multi-contrast data acquisitions useful for QSM are provided. These multi-contrast data are used to generate additional quantitative maps (e.g., $R^*_2$, $R'_2$) that are often needed to fit model parameters for QSM.

Figure 1:
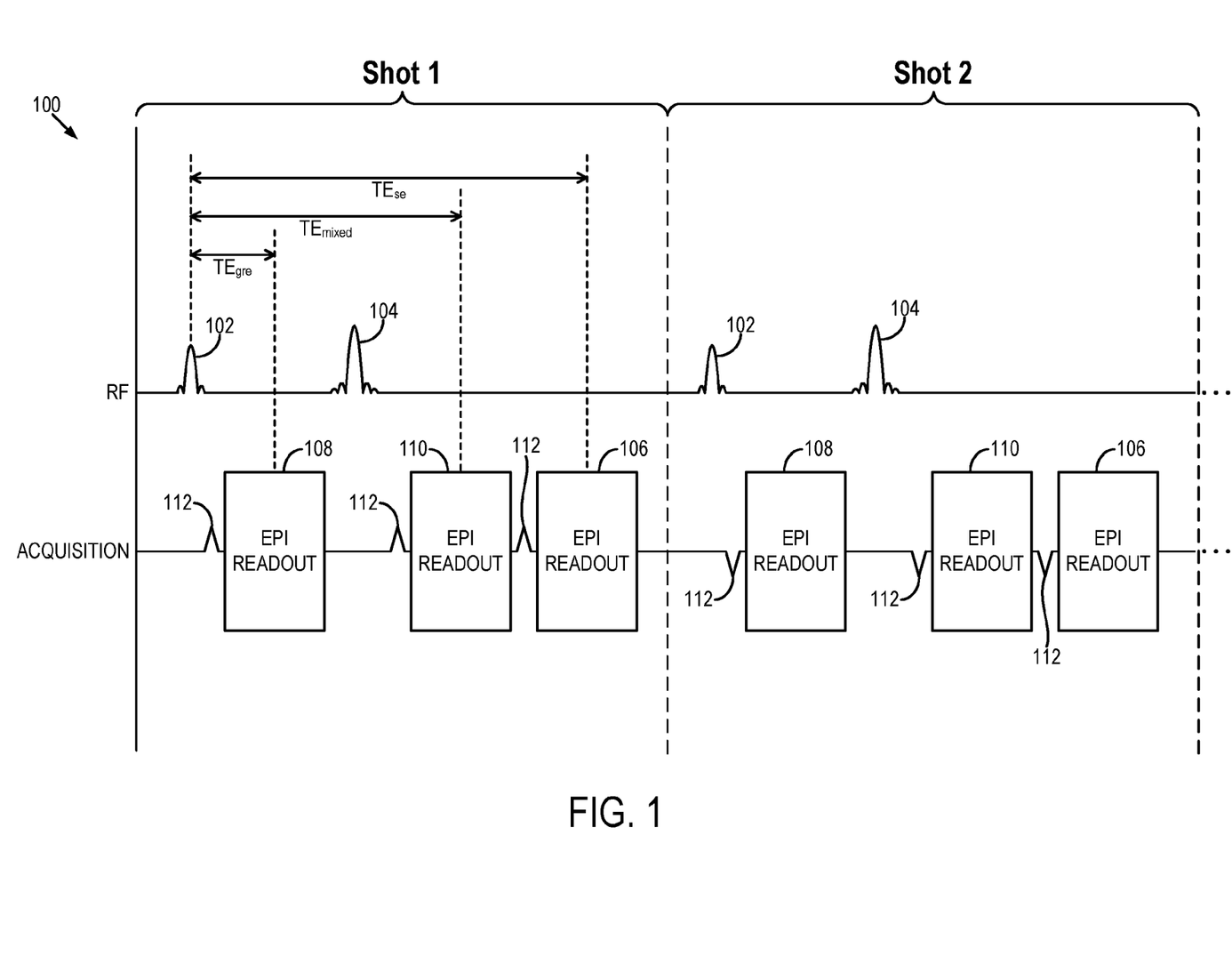
FIG. 1 is an example of a spin- and gradient-echo ("SAGE") pulse sequence utilizing blip up-down acquisition ("BUDA") encoding of echo planar imaging ("EPI") readouts to enable the acquisition of high-resolution multi-contrast k-space data for distortion-free imaging. Each scan can provide three echoes (a gradient echo, a mixed gradient and spin echo, and a spin echo). Multiple scans can provide additional contrasts by changing the echo times of the sequence.

An example SAGE pulse sequence with BUDA encoding is shown in FIG. 1. As described above, the pulse sequence 100 generally includes multiple shots and utilizes EPI for data acquisitions. The EPI readouts may implement a Cartesian sampling ok k-space, or a non-Cartesian sampling of k-space. In still other embodiments, data acquisition schemes other than EPI may also be implemented, such as echo planar time-resolved imaging ("EPTI") data acquisitions, such as the ones described in co-pending U.S. Pat. No. 11,022,665, which is herein incorporated by reference in its entirety. Additionally or alternatively, the overall data acquisition can be accelerated using in-plane acceleration (e.g., undersampling phase-encodings), through-plane acceleration (e.g., using simultaneous multislice acquisition techniques, such as CAIPIRINHA, blipped-CAIPI, wave-CAIPI, etc.), or combinations of both. In the illustrated example, two shots are shown; though, it will be understood by those skilled in the art that a multi-shot pulse sequence can include more than two shots. For instance, in some embodiments, the pulse sequence 100 may include three shots, four shots, five shots, six shots, etc. As a non-limiting example, the pulse sequence 100 may include four shots.

In each shot, a spin echo EPI acquisition is modified to acquire additional data. Each shot includes a radio frequency ("RF") excitation pulse 102 followed by an RF refocusing pulse 104. For instance, the RF excitation pulse 102 can be a 90-degree RF pulse and the RF refocusing pulse 104 can be a 180-degree RF pulse. In spin echo EPI acquisitions with late echo times ("TEs") used for T2 mapping, there are two potential periods with unused sequence time in each repetition time ("TR"): one period between the 90-degree excitation pulse 102 and the 180-degree refocusing pulse 104, and one period between the 180-degree refocusing pulse 104 and the spin-echo EPI readout 106. This unused sequence time can be exploited by inserting two additional EPI readouts 108, 110 thereby collecting three different contrasts (T2*-, T2'- and T2-weighted images with corresponding TEs, $TE_{gre}$, $TE_{mixed}$, $TE_{se}$) in one scan. In this way, gradient-echo contrasts are acquired in the first EPI readout 108, mixed gradient- and spin-echo contrasts are acquired in the second EPI readout 110, and spin-echo contrasts are acquired in the third EPI readout 106.

In order to mitigate distortion and blurring and achieve high resolution while enabling a wider range of TEs using high in-plane acceleration, a multi-shot EPI acquisition can be incorporated, as mentioned above. Alternating shots are sampled with opposite phase-encoding polarities (blip-up and blip-down). For instance, in the illustrated embodiment, in the first shot the polarity of the phase-encoding gradient blips 112 is positive (e.g., blip-up) and in the second shot the polarity of the phase-encoding gradient blips 112 is negative (e.g., blip-down). This pattern can repeat such that odd-numbered shots are sampled using a blip-up and even-numbered shots are sampled with a blip-down. In other embodiments, the odd-numbered shots can be sampled with blip-down gradients and the even-numbered shots can be sampled with blip-up gradients. In still other embodiments, different patterns of switching between blip-up and blip-down gradients may also be used. As a non-limiting example, when the pulse sequence 100 implements four shots, with the alternating shots being sampled with opposite phase-encoding polarities, two blip-up and two blip-down shots are collected for reconstruction.

Figure 2:
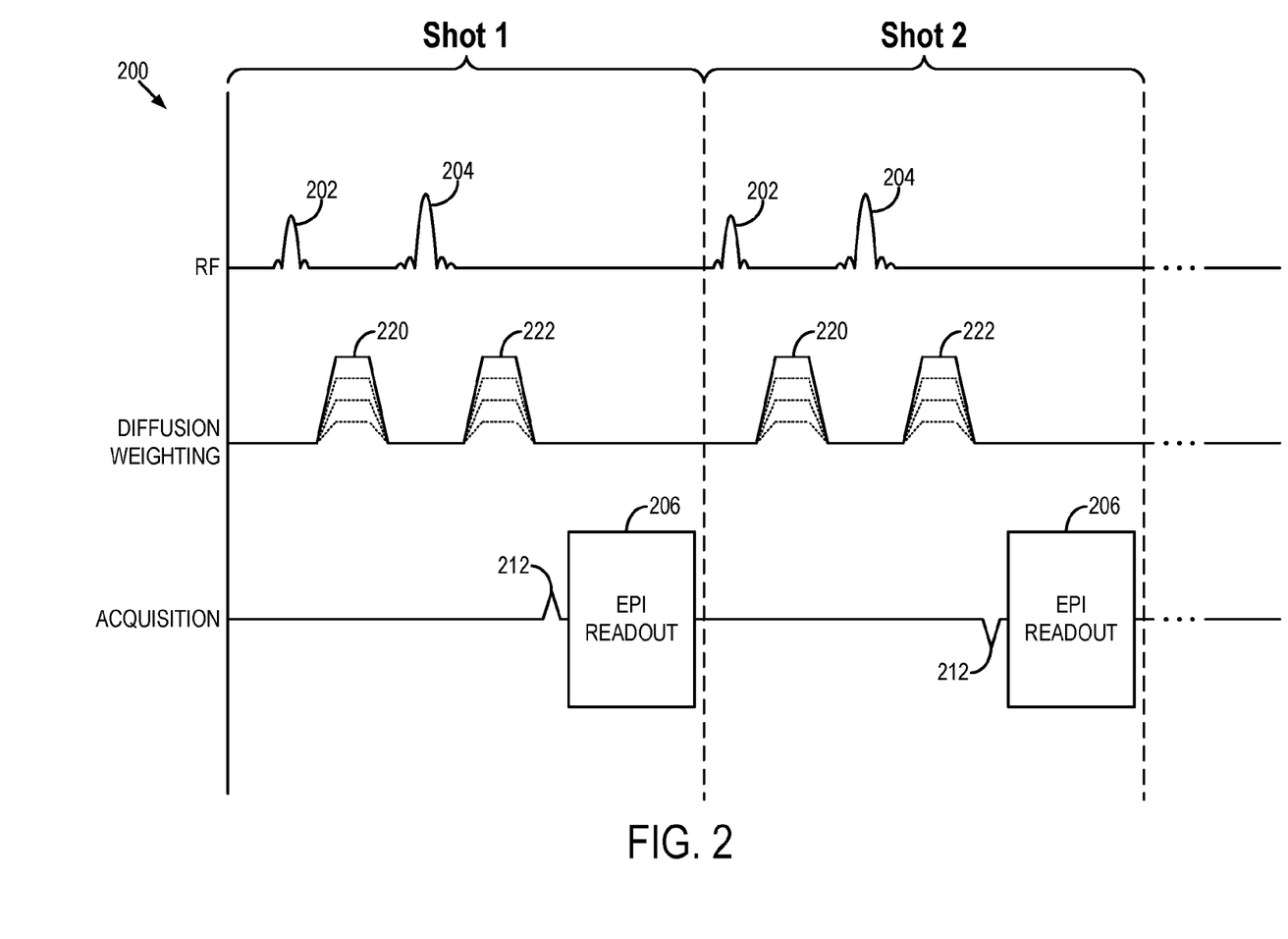
FIG. 2 is an example of a diffusion-weighted pulse sequence implementing BUDA encoding of EPI readouts to enable the acquisition of high-resolution diffusion-weighted k-space data for distortion-free imaging. The pulse sequence of FIG. 1 can be used to acquire non-diffusion-weighted data in a b-0 acquisition, collectively providing a diffusion SAGE ("dSAGE") acquisition.

An example dSAGE pulse sequence with BUDA encoding is shown in FIG. 2. The illustrated pulse sequence 200 includes the use of diffusion-encoding gradients 220, 222 to sensitive or weight the acquired magnetic resonance signals to diffusion. As mentioned above, a diffusion MRI pulse sequence routinely includes the acquisition of diffusion-weighted magnetic resonance data by using diffusion-encoding gradients 220, 222 prior to data acquisition, and also non-diffusion-weighted magnetic resonance data during a so-called b-0 acquisition in which diffusion-encoding gradients 220, 222 are not used. In the example dSAGE pulse sequence, the b=0 acquisition can be implemented using the pulse sequence 100 illustrated in FIG. 1 and described above. That is, the time during which diffusion-encoding gradients 220, 222 would otherwise be played out can be exploited to acquire additional multi-contrast magnetic resonance data, as described above. In particular, two additional readouts, with gradient and mixed gradient-spin echo contrasts, are added in the unused sequence time during the b-0 acquisition.

Similar to the pulse sequence 100 shown in FIG. 1, the diffusion-weighted repetitions of the dSAGE pulse sequence 200 generally include multiple shots and utilize EPI for data acquisitions. The EPI readouts may implement a Cartesian sampling ok k-space, or a non-Cartesian sampling of k-space. In still other embodiments, data acquisition schemes other than EPI may also be implemented, such as echo planar time-resolved imaging ("EPTI") data acquisitions, such as the ones described in co-pending U.S. Pat. No. 11,022,665, which is herein incorporated by reference in its entirety. Additionally or alternatively, the overall data acquisition can be accelerated using in-plane acceleration (e.g., undersampling phase-encodings), through-plane acceleration (e.g., using simultaneous multislice acquisition techniques, such as CAIPIRINHA, blipped-CAIPI, wave-CAIPI, etc.), or combinations of both. In the illustrated example, two shots are shown; though, it will be understood by those skilled in the art that a multi-shot pulse sequence can include more than two shots. For instance, in some embodiments, the pulse sequence 200 may include three shots, four shots, five shots, six shots, etc. As a non-limiting example, the pulse sequence 200 may include four shots.

Like the pulse sequence 100 shown above in FIG. 1 (and similarly, in the b=0 acquisitions of dSAGE), a spin echo EPI acquisition is implemented in the diffusion-weighted pulse sequence 200. Each shot includes a radio frequency ("RF") excitation pulse 202 followed by an RF refocusing pulse 204. For instance, the RF excitation pulse 202 can be a 90-degree RF pulse and the RF refocusing pulse 204 can be a 180-degree RF pulse. A first diffusion-encoding gradient 220 is played out before the refocusing pulse 204 and a second diffusion-encoding gradient 222 is played out after the refocusing pulse 204 and before the EPI readout 206. As is known in the art, the amplitude, duration, spacing, and/or polarity of the diffusion-encoding gradients 220, 222 are changed in different repetitions of the pulse sequence 200 in order to provide different diffusion weightings. The diffusion weighting provided in a repetition of the pulse sequence 200 can be characterized by the so-called "b-value," which is a parameter that depends on the strength, duration, and spacing of the diffusion encoding gradients 220, 222. As is also known in the art, by applying diffusion-encoding gradients 220, 222 along different spatial directions, the acquired data will be sensitized to diffusion occurring along different spatial directions (e.g., applying diffusion-encoding gradients 220, 222 along the x-axis to provide diffusion weighting for diffusion occurring in the x-direction; applying diffusion-encoding gradients 220, 222 along the y-axis to provide diffusion weighting for diffusion occurring in the y-direction; applying diffusion-encoding gradients 220, 222 along the z-axis to provide diffusion weighting for diffusion occurring in the z-direction; applying diffusion-encoding gradients 220, 222 along multiple ones of the x-, y-, and z-axes to provide diffusion weighting for diffusion occurring in arbitrary directions).

In order to mitigate distortion and blurring and achieve high resolution while enabling a wider range of TEs using high in-plane acceleration, a multi-shot EPI acquisition can be incorporated, as mentioned above. Alternating shots are sampled with opposite phase-encoding polarities (blip-up and blip-down). For instance, in the illustrated embodiment, in the first shot the polarity of the phase-encoding gradient blips 212 is positive (e.g., blip-up) and in the second shot the polarity of the phase-encoding gradient blips 212 is negative (e.g., blip-down). This pattern can repeat such that odd-numbered shots are sampled using a blip-up and even-numbered shots are sampled with a blip-down. In other embodiments, the odd-numbered shots can be sampled with blip-down gradients and the even-numbered shots can be sampled with blip-up gradients. In still other embodiments, different patterns of switching between blip-up and blip-down gradients may also be used. As a non-limiting example, when the pulse sequence 200 implements four shots, with the alternating shots being sampled with opposite phase-encoding polarities, two blip-up and two blip-down shots are collected for reconstruction.

In a non-limiting example, data were collected on a 3T MRI system using a dSAGE pulse sequence as described above. Diffusion-weighted data were acquired using the pulse sequence shown in FIG. 2, and non-diffusion-weighted data were acquired (e.g., in a b-0 acquisition) using the implementation of the pulse sequence shown in FIG. 1. A multichannel RF coil (e.g., an RF coil with 32-channel reception) was used with a field of view ("FOV") of 220× 220×120 mm at 1×1×4 mm$^3$ resolution. The b-value was set to b=1000 s/mm$^2$ during the diffusion-weighted acquisitions, and an acceleration factor of $R_{inplane} \times RSMS=6 \times 2$ with 4-shots was used. The diffusion-encoding gradients were applied along the x-, y- and z-directions, and the echo time ("TE") and repetition time ("TR") were 69 ms and 1700 ms, respectively, in the diffusion-weighted acquisitions. The b=0 acquisition was made using 4-shots at $R_{inplane} \times R_z=8 \times 2$ and partial Fourier=6/8, which provided three echoes at TEs=[12, 47, 69] ms.

As described above, to allow for quantitative T2 and T2* parameter mapping, additional multi-contrast data were acquired during the b-0 acquisition. In this non-limiting example, the additional data were acquired with 1×1×4 mm$^3$ resolution, $R_{inplane} \times R_z=8 \times 2$ and partial Fourier=6/8 using TR=2300 ms. Two separate groups of acquisitions were made at different TE settings to provide a total of six different contrasts. The TEs of the first group were [12, 47, 69] ms, whereas the second group utilized [36, 95, 117] ms.

Figure 3:
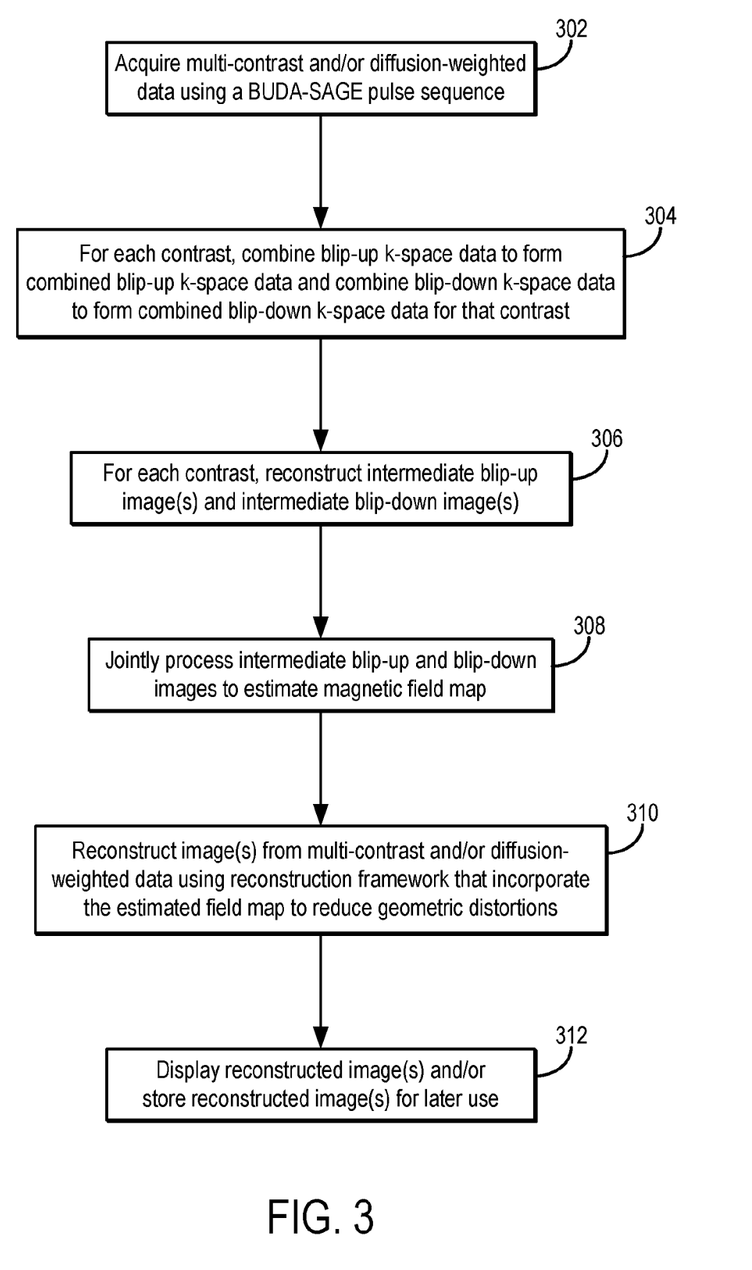
FIG. 3 is a flowchart setting forth the steps of an example method for acquiring multi-contrast and/or diffusion-weighted data using a BUDA-SAGE pulse sequence, and for reconstructing images from the acquired data.

With the acquired interleaved blip-up and blip-down shots, distortion-free images of each contrast and each scan can be reconstructed using a suitable reconstruction framework. Referring now to FIG. 3, an example method for acquiring magnetic resonance data (e.g., k-space data) using a BUDA-SAGE and/or BUDA-dSAGE acquisition and reconstructing images from those data is illustrated.

The method includes acquiring multi-contrast data using a BUDA-SAGE pulse sequence, as indicated at step 302. As described above, in some embodiments the BUDA-SAGE pulse sequence can be a non-diffusion-weighted pulse sequence (e.g., the pulse sequence in FIG. 1), such that the multi-contrast data do not include diffusion weighting. These data are useful for quantitative parameter mapping, such as T2, T2', T2*, paramagnetic susceptibility, and diamagnetic susceptibility mapping.

In some other embodiments, the BUDA-SAGE pulse sequence can also include a diffusion-weighted pulsed sequence. In these instances, diffusion-weighted data are acquired using a BUDA-dSAGE pulse sequence (e.g., the pulse sequence in FIG. 2), while the multi-contrast data are acquired in the b=0 acquisition (e.g., using the pulse sequence shown in FIG. 1). Advantageously, these diffusion-weighted and multi-contrast data allow for both diffusion MRI and quantitative parameter mapping.

As described above, the multi-contrast data and the diffusion-weighted data are acquired using a BUDA encoding scheme, such that the polarity of phase-encoding is alternated between different shots in a multi-shot acquisition. In this way, the multi-contrast data and/or diffusion-weighted data will include k-space data acquired when using positive polarity phase-encoding gradients (i.e., blip-up k-space data) and k-space data acquired when using negative polarity phase-encoding gradients (i.e., blip-down k-space data).

After the data are acquired, image reconstruction can proceed. For each contrast, the k-space data for the blip-up shots and blip-down shots are combined, resulting in combined blip-up k-space data and combined blip-down k-space data, as indicated at step 304. As an example, the blip-up k-space data and the blip-down k-space data can be combined by summing the data in a sliding-window fashion. As mentioned, this process is repeated for each contrast (e.g., each different contrast in the multi-contrast data, each different diffusion weighting in the diffusion-weighted data). In a non-limiting example, then, the combination of blip-up and blip-down data for each contrast can result in a combined blip-up k-space data set for each contrast (e.g., T2-weighting, T2'-weighting, T2*- weighting, each diffusion weighting) and a combined blip-down k-space data set for each contrast (e.g., T2-weighting, T2'-weighting, T2*-weighting, each diffusion weighting).

Intermediate blip-up and blip-down image pairs are then reconstructed, as indicated at step 306. The intermediate images can be reconstructed using any suitable image reconstruction technique. As a non-limiting example, the intermediate images can be reconstructed using a parallel image reconstruction technique, such as a SENSE reconstruction. Stemming from field inhomogeneity, the intermediate blip-up/down images have opposite geometric distortions due to the reversed phase-encoding direction.

The intermediate blip-up/down image pairs are jointly processed to estimate a field map, as indicated at step 308. Advantageously, each pair of blip-up/down intermediate images (T2*, T2', T2 weighted, diffusion weighted) from each can all be provided as inputs to jointly estimate a field map, rather than using only a single pair of images, based on the ability of the BUDA-SAGE pulse sequences described in the present disclosure to provide multiple contrasts. As a non-limiting example, the field map can be estimated using the "topup" tool implemented with FSL software (https://fsl.fmrib.ox.ac.uk/fsl/fslwiki), which implements methods similar to those described by J. L. R. Andersson, et al., in "How to Correct Susceptibility Distortions in Spin-Echo Echo-Planar Images: Application to Diffusion Tensor Imaging," *NeuroImage*, 2003; 20(2):870-888.

The final image(s) can then be reconstructed by incorporating the estimated field map into a suitable iterative image reconstruction technique, as indicated at step 310. As a non-limiting example, the estimated field map can be incorporated into a Hankel structured low-rank constrained joint reconstruction, which can be given as, $$\min_x \sum_{s=1}^{N_s} \|F_s W_s C x_s - d_s\|_2^2 + \lambda \|H(x)\|_*; \quad (1)$$

where $F_s$ is the Fourier operator in shot, S, which may be an undersampled Fourier operator (e.g., when undersampling is used to accelerate the data acquisition); $W_s$ is a distortion operator (e.g., off-resonance information estimated from all interim blip-up/down image pairs) in shot s; C is the coil sensitivity map, which in some instances can be estimated from calibration data (e.g., estimated from distortion-free spin-warp gradient-echo calibration data using ESPIRIT or another suitable technique); and $d_s$ is the k-space data acquired for each shot, S. The second term, $\|H(x)\|_*$, enforces low-rank prior on the block-Hankel representation of the blip-up and blip-down data, which can be implemented by selecting n×n (e.g., n=7) neighborhood points in k-space from each shot and then concatenating them in the column dimension.

The reconstruction can be implemented using a projection onto convex sets ("POCS") like iteration that alternates between data consistency and low-rank truncation steps. In some implementations, a tolerance of 0.01% RMSE between two successive iterations can be utilized. Alternatively, other tolerances between successive iterations can be used.

In some embodiments, a noise reduction term can be incorporated into the image reconstruction. For example, the iterative reconstruction can be given as, $$\min_x \sum_{s=1}^{N_s} \|F_s W_s C x_s - d_s\|_2^2 + \lambda \|H(x)\|_* + \lambda_2 \cdot bm3d(x); \quad (2)$$

where bm3d (x) is a block-matching and three-dimensional filtering constraint used for noise reduction, an example of which is described by K. Dabov, et al., in "Image Denoising by Sparse 3-D Transform-Domain Collaborative Filtering," *IEEE Trans. Image Process.*, 2007; 16:2080-2095. Alternatively, other denoising constraints can also be used, including a BM4D method, in lieu of a BM3D method. Briefly, the BM4D method groups similar 3-dimensional blocks into 4-dimensional data arrays to enhance the data sparsity and then performs collaborative filtering to achieve superior denoising performance. As a non-limiting example, the BM4D denoising can be performed assuming Rician noise with an unknown noise standard deviation on the magnitude data, and can be set to estimate the noise standard deviation and perform collaborative Wiener filtering with a modified profile.

Alternatively, Eqn. (1) can be used for image reconstruction and denoising can be implemented with a post-reconstruction denoising technique. For instance, as described below, denoising can be implemented using a machine learning algorithm, such as a neural network based denoising. As a non-limiting example, unsupervised denoising and/or self-supervised denoising can be implemented using suitably constructed and trained neural networks.

The reconstructed image(s) can then be displayed to a user or stored for later use, as indicated at step 312. For instance, the images can be stored for further processing. As an example, the images can be processed to generate quantitative parameter maps, such as diffusion parameter maps (e.g., apparent diffusion coefficient, mean diffusivity), T2 and/or R2 maps, T2' and/or R2' maps, T2* and/or R2* maps, susceptibility maps, and the like. The 3-direction averaged DWI and ADC maps can be calculated after image reconstruction of each diffusion weighted data. As an example, quantitative T2 and T2* parameter maps can be obtained using Bloch dictionary matching on the images reconstructed from the multi-contrast data. Examples for generating susceptibility maps for quantitative susceptibility mapping ("QSM") are described below in more detail.

As mentioned above, in some embodiments denoising can be incorporated into the image reconstruction framework using a suitable denoising constraint. In other embodiments, denoising can be implemented using a machine learning algorithm, machine learning prior, or the like. The machine learning algorithm or prior can implement unsupervised denoising, self-supervised denoising, or the like. As a non-limiting example, an MR-Self2Self ("MR-S2S") neural network ("NN") can be implemented to perform denoising after image reconstruction.

Figure 4:
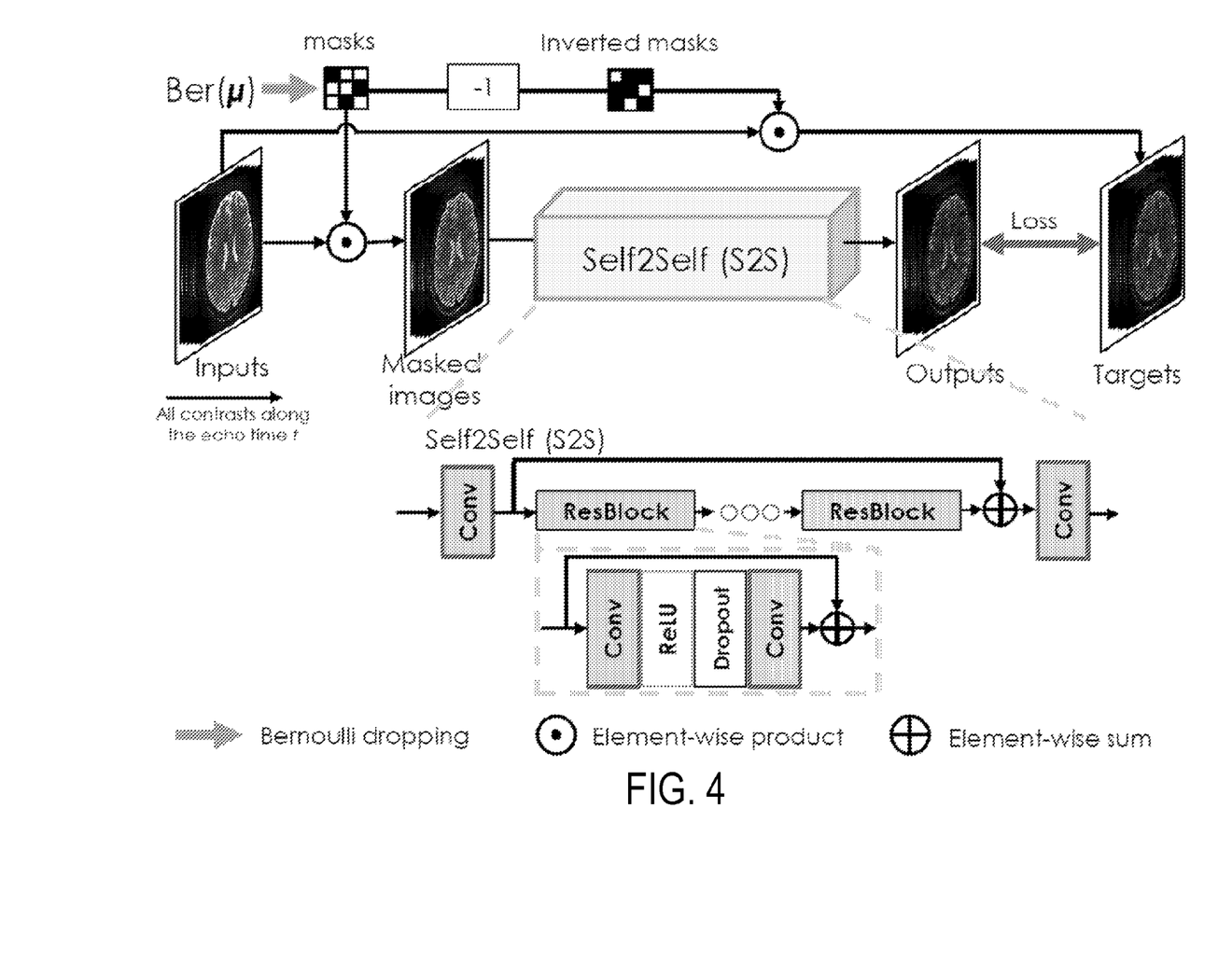
FIG. 4 is an example network diagram for a self-supervised MR-Self2Self ("MR-S2S") neural network model for image denoising.

Taking noisy images as inputs, MR-S2S employs convolutions and deconvolutions at the beginning and end of the model architecture for image compression and upsampling, respectively. In the middle part of the MR-S2S, multiple ResBlocks are constructed to extract hierarchical features from the image. Each ResBlock includes stacked convolutional filters paired with ReLU activation functions and dropout regularization. An example of the MR-S2S model architecture is shown in FIG. 4.

To train the proposed MR-S2S network, a mask, m, whose elements are independent identically distributed ("iid") sampled from a Bernoulli distribution with parameter, μ, (e.g., 0.3 in an example experiment) is used at each training epoch. To form the input data of the network, the mask, m, is voxel-wise multiplied with the noisy images (e.g., all contrasts along the echo time t to form image volumes that are obtained by BUDA-SAGE reconstruction). At the same time, the corresponding complementary mask, (1-m), is obtained. This complementary mask is also voxel-wise multiplied with the same noisy image to provide the target image. The L2-norm loss between the outputs (e.g., the results after going through MR-S2S network) and targets is minimized to train the MR-S2S network. A single MR-S2S model can be trained for each slice of all contrasts.

In the test phase, for each noisy image, multiple Bernoulli masks (e.g., 100 masks) can be sampled to obtain masked images. At the end of MR-S2S, the outputs from the corresponding masked images can be averaged as the final result, leading to effective image denoising.

The MR-S2S network can be implemented using Keras application programming interface ("API") with a Tensorflow backend. The L2-norm loss can be used to optimize the NN's parameters using the Adam optimizer. In an example implementation, the following setting details of the parameters can be used: number of ResBlocks=10, number of filters=64, learning rate=0.0005, number of epochs=30, kernel size=3×3, batch size=4.

Advantageously, this self-supervised training is capable of performing denoising without clean targets. In some implementations, data augmentation can be adopted, which samples complementary Bernoulli masks randomly to generate many pairs of training samples to prevent the network from converging to an identity map. A dropout step can also employed to randomly prune nodes to increase the statistical independence of the outputs.

To speed-up MR-S2S, it can be possible to pre-train the model on a set of subjects, then fine-tune it on each specific test subject's data using a much smaller number of epochs. Extending MR-S2S to perform volumetric denoising can also provide additional performance gain, which can also make this approach more amenable to fine-tuning since there would be a single model trained for the entire volume, rather than a different network per slice.

In some embodiments, a Slider encoding can additionally be implemented to improve through-plane image resolution. For example, a super-resolution reconstruction can be performed on the images from step 310 above, which can allow for 1 mm isotropic resolution.

In general, Slider acquires $N_{slider}$ sets of high SNR, thick slice data (e.g., at resolution $1\times1\times N_{slider}$ mm$^3$) with a 1 mm shift between each set along the slice direction to achieve 1 mm isotropic resolution final results. To achieve thin-slice, high-resolution reconstruction, data are first reconstructed using the BUDA-SAGE reconstruction described above with respect to FIG. 3. The thin slices are then resolved within the acquired thick slice images using linear reconstruction with Tikhonov regularization:

$$z=(A^TA+\lambda_{Tik}I)^{-1}A^Tb=A_{inv\_Tik}b \qquad (3);$$

where A is the Slider encoding matrix that sums adjacent slices, b is the concatenation of the acquired Slider-encoded thick slice images (at a given x, y position), and z is the corresponding high slice resolution reconstruction. As a non-limiting example, $\lambda_{Tik}$ is the Tikhonov regularization parameter and was set to 0.2 to achieve a high SNR gain and sharp slice resolution based on a retrospective experiment. In some implementations, slice profile information can be flexibly incorporated into Eqn. (3).

As mentioned above, in some embodiments the images reconstructed from multi-contrast data acquired using a BUDA-SAGE pulse sequence can be processed to generate quantitative susceptibility maps. In a BUDA-SAGE acquisition with EPI readouts, the magnetic resonance signal evolution can be describes based on the following equation:

$$S(t) = \begin{cases} S_0^I \cdot e^{-t\cdot R_2^*}, & 0 < t < TE_{SE} \\ S_0^{II} \cdot e^{-TE_{SE}\cdot(R_2^*-R_2)} \cdot e^{-t\cdot(2\cdot R_2 - R_2^*)}, & TE_{SE}/2 < t < TS_{SE}; \end{cases} \qquad (4)$$

where S(t) is the MRI signal acquired at the echo time, t, in a BUDA-SAGE EPI time series. Voxel-wise estimates of $S_0^I$, $S_0^{II}$, $R_2=1/T_2$, and $R_2^*=1/T_2^*$ can be obtained through a least-squares solution of Eqn. (4) from signal values in acquired multi-contrast magnetic resonance data acquired using a BUDA-SAGE pulse sequence as described above. From these estimates, an additional parameter $\delta=S_0^I/S_0^{II}$ can be obtained, which accounts for residual signal difference owing to imperfectly matched slice profiles between echo trains acquired before and after the refocusing 180-degree pulse. The voxel-wise estimates of $\delta$ can be assumed to be constant for the whole BUDA-SAGE EPI acquisition. Therefore, the least-squares solution of Eqn. (4) for each time point can include three unknown values instead of four unknown values; namely, $\delta$, $R_2$, and $R_2^*$. With this three-parameter fit, it is possible to achieve better temporal signal stability compared to a four-parameter fit.

The values of & in each voxel estimated from the three-parameter fit can be used in a subsequent two-parameter Bloch dictionary match. The three parameters ($\delta$, $R_2$, $R_2^*$) can be discretized to build a dictionary adapted to the data acquired using a BUDA-SAGE pulse sequence. As a non-limiting example, the range of $\delta$ can be 1.00-1.65, which was determined by the values estimated from a three-parameter iteration fit, and which can be discretized (e.g., discretized to one hundred values) to form the dictionary. For each $\delta$, discretized values of $T_2$ and $T_2^*$ are used to form the signal, S, based on Eqn. (4). As a non-limiting example, the $T_2$ values can be set as [1:1:50; 52:2:150; 155:5:500], and the $T_2$ values can be set as [1:1:50; 52:2:150; 155:5:300], where the notation [x:n:y] indicates a range of values from x to y in steps of n. The signal, S, (all the echoes after BUDA-SAGE reconstruction and optionally MR-S2S or other denoising) can be matched with the dictionary for each voxel by maximizing their dot product, which yields the corresponding $T_2$ and $T_2^*$ values.

Additional maps can also be obtained after the dictionary match, including $R_2$ maps, $R_2^*$ maps, and $R'_2$ maps, where $R'_2=R_2^*-R_2$. Susceptibility maps can also be estimated using the gradient echoes from the BUDA-SAGE acquisition with nonlinear dipole inversion ("NDI"), or another suitable technique. The NDI technique is based on the nonlinear-MEDI ("NMEDI") approach, but in which magnitude weighting and nonlinear formulation are exploited as inherent regularizers along with a simple Tikhonov penalty. Phase pre-processing steps can include brain masking, Laplacian phase unwrapping, and V-SHARP background removal with the largest kernel size of 25 voxels. Using the estimated $R'_2$ information, susceptibility source separation reconstruction can also performed, which provides additional paramagnetic and diamagnetic susceptibility maps.

Figure 5:
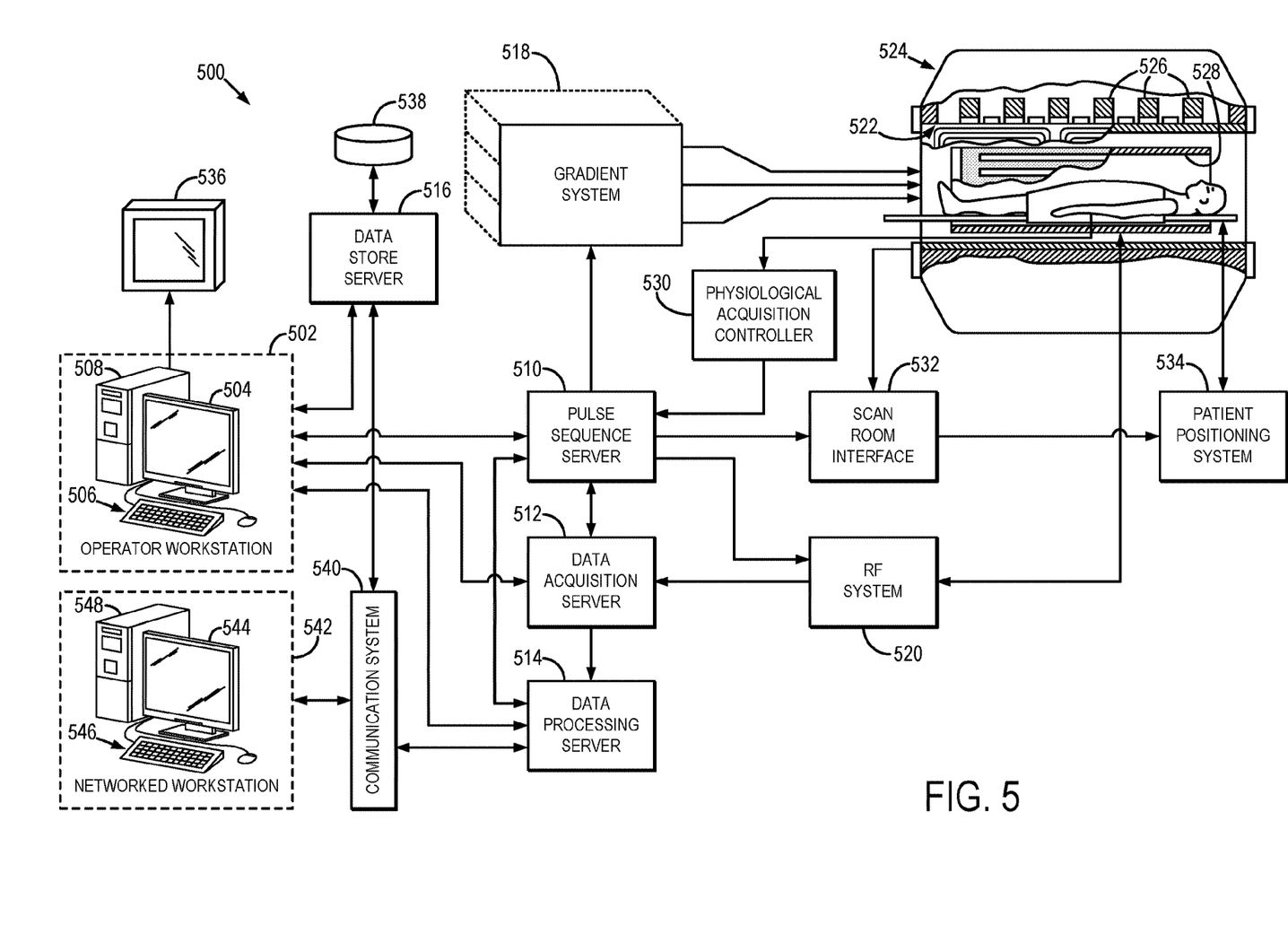
FIG. 5 is a block diagram of a magnetic resonance imaging ("MRI") system that can implement the methods described in the present disclosure.

Referring particularly now to FIG. 5, an example of an MRI system 500 that can implement the methods described here is illustrated. The MRI system 500 includes an operator workstation 502 that may include a display 504, one or more input devices 506 (e.g., a keyboard, a mouse), and a processor 508. The processor 508 may include a commercially available programmable machine running a commercially available operating system. The operator workstation 502 provides an operator interface that facilitates entering scan parameters into the MRI system 500. The operator workstation 502 may be coupled to different servers, including, for example, a pulse sequence server 510, a data acquisition server 512, a data processing server 514, and a data store server 516. The operator workstation 502 and the servers 510, 512, 514, and 516 may be connected via a communication system 540, which may include wired or wireless network connections.

The pulse sequence server 510 functions in response to instructions provided by the operator workstation 502 to operate a gradient system 518 and a radiofrequency ("RF") system 520. Gradient waveforms for performing a prescribed scan are produced and applied to the gradient system 518, which then excites gradient coils in an assembly 522 to produce the magnetic field gradients $G_x$, $G_y$, and $G_z$ that are used for spatially encoding magnetic resonance signals. The gradient coil assembly 522 forms part of a magnet assembly 524 that includes a polarizing magnet 526 and a whole-body RF coil 528.

RF waveforms are applied by the RF system 520 to the RF coil 528, or a separate local coil to perform the prescribed magnetic resonance pulse sequence. Responsive magnetic resonance signals detected by the RF coil 528, or a separate local coil, are received by the RF system 520. The responsive magnetic resonance signals may be amplified, demodulated, filtered, and digitized under direction of commands produced by the pulse sequence server 510. The RF system 520 includes an RF transmitter for producing a wide variety of RF pulses used in MRI pulse sequences. The RF transmitter is responsive to the prescribed scan and direction from the pulse sequence server 510 to produce RF pulses of the desired frequency, phase, and pulse amplitude waveform. The generated RF pulses may be applied to the whole-body RF coil 528 or to one or more local coils or coil arrays.

The RF system 520 also includes one or more RF receiver channels. An RF receiver channel includes an RF preamplifier that amplifies the magnetic resonance signal received by the coil 528 to which it is connected, and a detector that detects and digitizes the I and Q quadrature components of the received magnetic resonance signal. The magnitude of the received magnetic resonance signal may, therefore, be determined at a sampled point by the square root of the sum of the squares of the I and Q components:

$$M = \sqrt{I^2 + Q^2};$$

and the phase of the received magnetic resonance signal may also be determined according to the following relationship:

$$\varphi = \tan^{-1}\left(\frac{Q}{I}\right).$$

The pulse sequence server 510 may receive patient data from a physiological acquisition controller 530. By way of example, the physiological acquisition controller 530 may receive signals from a number of different sensors connected to the patient, including electrocardiograph ("ECG") signals from electrodes, or respiratory signals from a respiratory bellows or other respiratory monitoring devices. These signals may be used by the pulse sequence server 510 to synchronize, or "gate," the performance of the scan with the subject's heart beat or respiration.

The pulse sequence server 510 may also connect to a scan room interface circuit 532 that receives signals from various sensors associated with the condition of the patient and the magnet system. Through the scan room interface circuit 532, a patient positioning system 534 can receive commands to move the patient to desired positions during the scan.

The digitized magnetic resonance signal samples produced by the RF system 520 are received by the data acquisition server 512. The data acquisition server 512 operates in response to instructions downloaded from the operator workstation 502 to receive the real-time magnetic resonance data and provide buffer storage, so that data is not lost by data overrun. In some scans, the data acquisition server 512 passes the acquired magnetic resonance data to the data processor server 514. In scans that require information derived from acquired magnetic resonance data to control the further performance of the scan, the data acquisition server 512 may be programmed to produce such information and convey it to the pulse sequence server 510. For example, during pre-scans, magnetic resonance data may be acquired and used to calibrate the pulse sequence performed by the pulse sequence server 510. As another example, navigator signals may be acquired and used to adjust the operating parameters of the RF system 520 or the gradient system 518, or to control the view order in which k-space is sampled. In still another example, the data acquisition server 512 may also process magnetic resonance signals used to detect the arrival of a contrast agent in a magnetic resonance angiography ("MRA") scan. For example, the data acquisition server 512 may acquire magnetic resonance data and processes it in real-time to produce information that is used to control the scan.

The data processing server 514 receives magnetic resonance data from the data acquisition server 512 and processes the magnetic resonance data in accordance with instructions provided by the operator workstation 502. Such processing may include, for example, reconstructing two-dimensional or three-dimensional images by performing a Fourier transformation of raw k-space data, performing other image reconstruction algorithms (e.g., iterative or backprojection reconstruction algorithms), applying filters to raw k-space data or to reconstructed images, generating functional magnetic resonance images, or calculating motion or flow images.

Images reconstructed by the data processing server 514 are conveyed back to the operator workstation 502 for storage. Real-time images may be stored in a data base memory cache, from which they may be output to operator display 502 or a display 536. Batch mode images or selected real time images may be stored in a host database on disc storage 538. When such images have been reconstructed and transferred to storage, the data processing server 514 may notify the data store server 516 on the operator workstation 502. The operator workstation 502 may be used by an operator to archive the images, produce films, or send the images via a network to other facilities.

The MRI system 500 may also include one or more networked workstations 542. For example, a networked workstation 542 may include a display 544, one or more input devices 546 (e.g., a keyboard, a mouse), and a processor 548. The networked workstation 542 may be located within the same facility as the operator workstation 502, or in a different facility, such as a different healthcare institution or clinic.

The networked workstation 542 may gain remote access to the data processing server 514 or data store server 516 via the communication system 540. Accordingly, multiple networked workstations 542 may have access to the data processing server 514 and the data store server 516. In this manner, magnetic resonance data, reconstructed images, or other data may be exchanged between the data processing server 514 or the data store server 516 and the networked workstations 542, such that the data or images may be remotely processed by a networked workstation 542.

The present disclosure has described one or more preferred embodiments, and it should be appreciated that many equivalents, alternatives, variations, and modifications, aside from those expressly stated, are possible and within the scope of the invention.

The invention claimed is:

1. A method for magnetic resonance imaging, the method comprising:
   (a) acquiring, with a magnetic resonance imaging (MRI) system, multi-contrast data using a multi-shot echo planar imaging (msEPI) pulse sequence comprising multiple shots, wherein a phase-encoding polarity is changed across the multiple shots of the msEPI pulse sequence and wherein in each shot data are acquired at a first echo time associated with a gradient echo, a second echo time associated with a mixed gradient-and-spin echo, and a third echo time associated with a spin echo;
   (b) computing field inhomogeneity data from the multi-contrast data; and
   (c) reconstructing an image from the multi-contrast data using the field (c) inhomogeneity data in order to reduce geometric distortions in the reconstructed image;
   wherein the phase-encoding polarity is alternated with each subsequent shot in the msEPI pulse sequence.

2. The method of claim 1, wherein computing the field inhomogeneity data comprises:

reconstructing intermediate blip-up images from the multi-contrast data acquired in shots using a positive polarity phase-encoding;

reconstructing intermediate blip-down images from the multi-contrast data acquired in shots using a negative polarity phase-encoding; and estimating the field inhomogeneity data from the intermediate blip-up images and the intermediate blip-down images.

3. The method of claim 2, wherein the field inhomogeneity data comprise a field map.

4. The method of claim 1, wherein the image is reconstructed using a reconstruction framework that implements a Hankel structured low-rank regularization.

5. The method of claim 4, wherein the reconstruction framework incorporates the field inhomogeneity data to reduce geometric distortions while reconstructing the image.

6. The method of claim 1, wherein at least one of the first echo time, the second echo time, and the third echo time are adjusted in subsequent repetitions of the pulse sequence in order to provide different contrast weightings in the multi-contrast data.

7. The method of claim 1, wherein reconstructing the image from the multi-contrast data comprises reconstructing a plurality of images having different contrast weightings.

8. The method of claim 7, further comprising generating a quantitative parameter map from the plurality of images.

9. The method of claim 8, wherein the quantitative parameter map comprises at least one of a T2 map, a T2' map, a T2* map, a paramagnetic susceptibility map, or a diamagnetic susceptibility map.

10. The method of claim 1, further comprising acquiring diffusion-weighted data using a second msEPI pulse sequence comprising multiple shots, wherein the phase-encoding polarity is changed across the multiple shots of the second msEPI pulse sequence and wherein in each shot data are acquired following application of diffusion encoding gradients.

11. The method of claim 10, wherein the multi-contrast data are acquired as b=0 acquisition data, and wherein reconstructing the image from the multi-contrast data comprises reconstructing a plurality of images having different contrast weightings.

12. The method of claim 10, further comprising reconstructing diffusion-weighted images from the diffusion-weighted data.

13. The method of claim 12, further comprising generating a diffusion parameter map using the image reconstructed from the multi-contrast data and the diffusion-weighted images reconstructed from the diffusion-weighted data, wherein the image reconstructed from the multi-contrast data comprises a b=0 image.

14. The method of claim 1, further comprising denoising the image reconstructed from the multi-contrast data.

15. The method of claim 14, wherein the image is denoised by inputting the image to a neural network, generating output as a denoised image.

16. The method of claim 15, wherein the neural network comprises an MR-Self2Self (MR-S2S) model architecture.

17. The method of claim 16, wherein the MR-S2S neural network is trained using self-supervised learning.

18. A method for magnetic resonance imaging, the method comprising:
(a) acquiring, with a magnetic resonance imaging (MRI) system, multi-contrast data using a multi-shot echo planar imaging (msEPI) pulse sequence comprising multiple shots, wherein a phase-encoding polarity is changed across the multiple shots of the msEPI pulse sequence and wherein in each shot data are acquired at a first echo time associated with a gradient echo, a second echo time associated with a mixed gradient-and-spin echo, and a third echo time associated with a spin echo;
(b) computing field inhomogeneity data from the multi-contrast data; and
(c) reconstructing an image from the multi-contrast data using the field inhomogeneity data in order to reduce geometric distortions in the reconstructed image;
wherein computing the field inhomogeneity data comprises:
reconstructing intermediate blip-up images from the multi-contrast data acquired in shots using a positive polarity phase-encoding;
reconstructing intermediate blip-down images from the multi-contrast data acquired in shots using a negative polarity phase-encoding; and
estimating the field inhomogeneity data from the intermediate blip-up images and the intermediate blip-down images.

19. A method for magnetic resonance imaging, the method comprising:
(a) acquiring, with a magnetic resonance imaging (MRI) system, multi-contrast data using a multi-shot echo planar imaging (msEPI) pulse sequence comprising multiple shots, wherein a phase-encoding polarity is changed across the multiple shots of the msEPI pulse sequence and wherein in each shot data are acquired at a first echo time associated with a gradient echo, a second echo time associated with a mixed gradient-and-spin echo, and a third echo time associated with a spin echo;
(b) computing field inhomogeneity data from the multi-contrast data;
(c) reconstructing an image from the multi-contrast data using the field inhomogeneity data in order to reduce geometric distortions in the reconstructed image; and
further comprising acquiring diffusion-weighted data using a second msEPI pulse sequence comprising multiple shots, wherein the phase-encoding polarity is changed across the multiple shots of the second msEPI pulse sequence and wherein in each shot data are acquired following application of diffusion encoding gradients.

20. A method for magnetic resonance imaging, the method comprising:
(a) acquiring, with a magnetic resonance imaging (MRI) system, multi-contrast data using a multi-shot echo planar imaging (msEPI) pulse sequence comprising multiple shots, wherein a phase-encoding polarity is changed across the multiple shots of the msEPI pulse sequence and wherein in each shot data are acquired at a first echo time associated with a gradient echo, a second echo time associated with a mixed gradient-and-spin echo, and a third echo time associated with a spin echo;

(b) computing field inhomogeneity data from the multi-contrast data;

(c) reconstructing an image from the multi-contrast data using the field (c) inhomogeneity data in order to reduce geometric distortions in the reconstructed image and (d) denoising the image reconstructed from the multi-contrast data.

\* \* \* \* \*